A. D. KENNEDY.
SEED CLEANING MACHINE.
APPLICATION FILED MAR. 5, 1913.
1,075,480.
Patented Oct. 14, 1913.
2 SHEETS—SHEET 1.
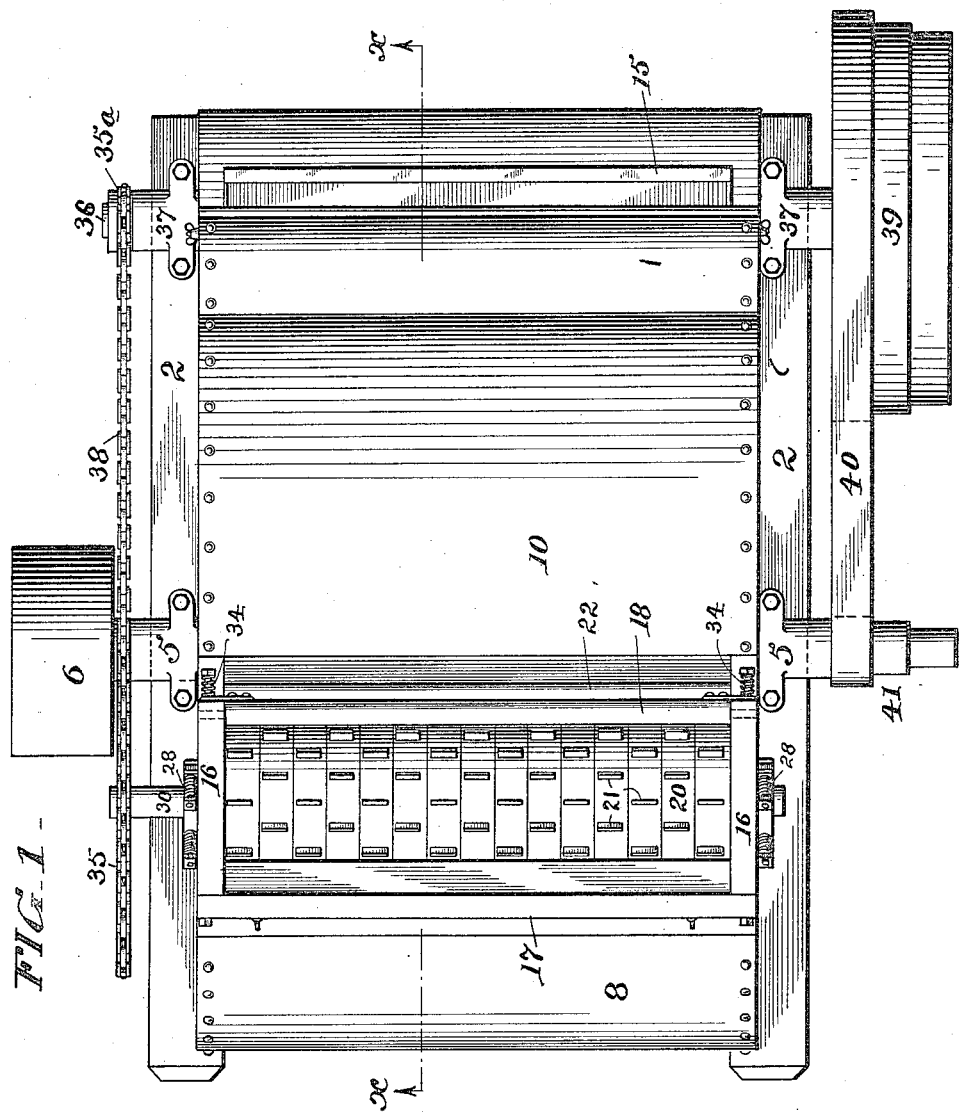
Witnesses
Daniel Webster Jr.
E. W. Smith.
Inventor
Alfred D. Kennedy
By 
Attorney

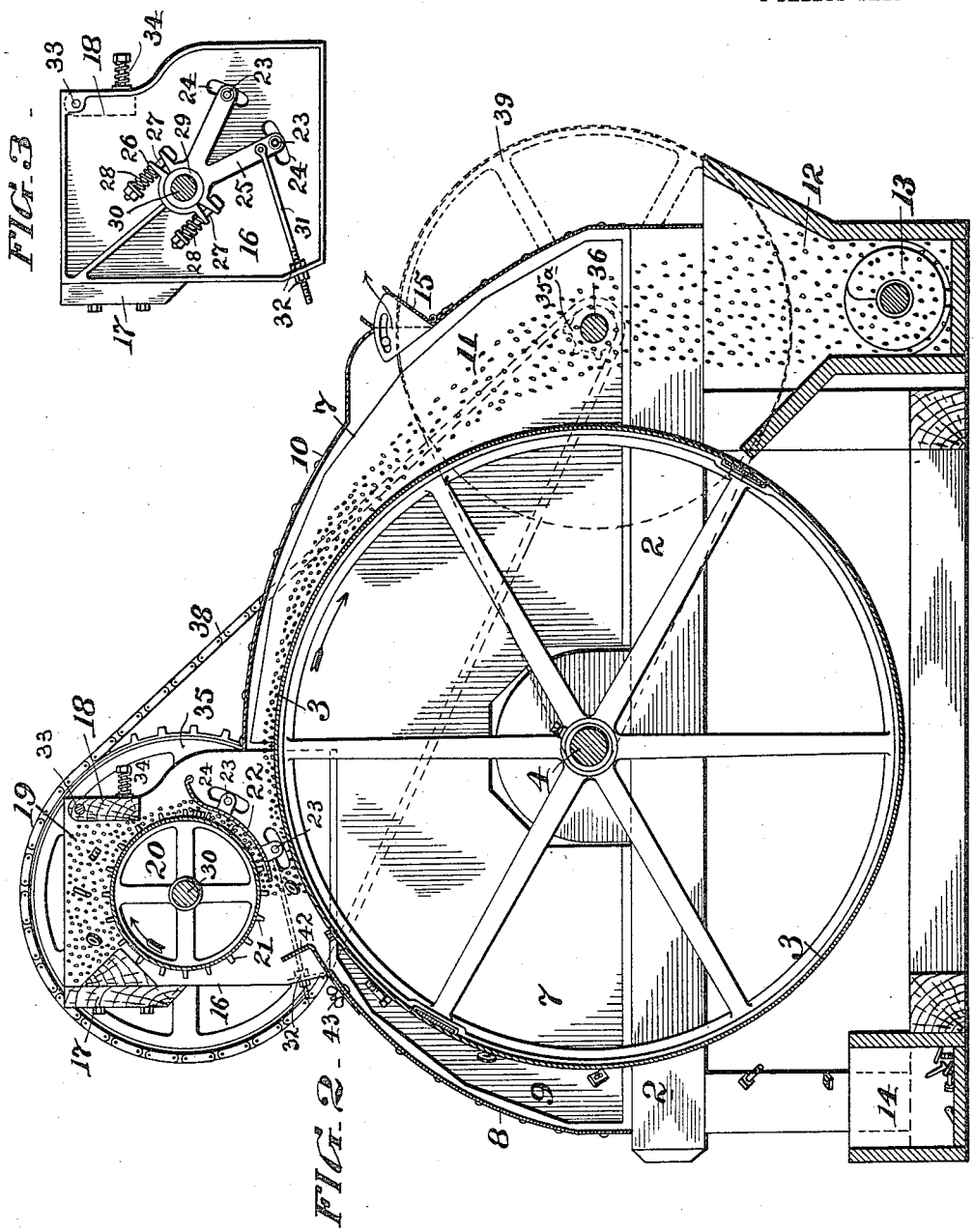

UNITED STATES PATENT OFFICE.

ALFRED D. KENNEDY, OF GREENVILLE, SOUTH CAROLINA, ASSIGNOR OF ONE-HALF TO AMERICAN MACHINE & MANUFACTURING COMPANY, A CORPORATION OF NORTH CAROLINA.

SEED-CLEANING MACHINE.

1,075,480.  Specification of Letters Patent.  Patented Oct. 14, 1913.

Application filed March 5, 1913. Serial No. 752,028.

*To all whom it may concern:*

Be it known that I, ALFRED D. KENNEDY, citizen of the United States, and resident of Greenville, county of Greenville, and State of South Carolina, have invented an Improvement in Seed-Cleaning Machines, of which the following is a specification.

The object of my invention is to provide a construction of machine suitable for cleaning cotton seeds and other seeds, whereby foreign metallic objects and deleterious articles of heavy weight may be separated from the seed in a speedy and efficient manner.

In general construction, my machine embodies a large drum which is rotated at a relatively high speed, said drum inclosed within a casing and adapted to produce a sufficient friction and draft to cause the lighter seeds to pass with it in the direction of its rotation, while the metallic or heavy articles fall by gravity over its surface in a direction opposite to its surface rotation and thereby become separated from the seeds, the said drum being combined with a feeding cylinder arranged above it and provided with feeding blades traveling over a guide apron to supply the seed to the revolving drum in measured quantities and so position the delivery that its action of gravity will definitely separate the metal and heavy objects from the lighter seeds, notwithstanding the friction and draft due to the drum, the said feeding apron being so supported that it may yield or move backward from the feeding cylinder against spring or yielding pressure should hard objects be jammed between said apron and the feeding blades of the cylinder.

My improvements further embody features of adjustment for the apron circumferentially under the feeding cylinder to advance or retard the delivery of the seeds to the drum according to the requirements due to the specific gravity of the seeds being cleaned. I further provide a spring operated guide for the hopper to coact with the feeding cylinder, so as to retain the seed in the hopper except as it may be definitely and positively conveyed therefrom by the blades, said guide being yieldingly supported so as to permit the passage of large metallic or hard foreign objects without danger of injury to the machine.

My invention also comprehends other features of construction which, together with those above referred to, will be better understood by reference to the drawings, in which:—

Figure 1 is a plan view of my improved machine; Fig. 2 is a sectional elevation of the same taken on line $x$—$x$ of Fig. 1; and Fig. 3 is a side elevation of the adjusting means of the feeding means of the hopper.

2 is the base frame and upon it is mounted a drum shaft 4, journaled in bearings 5, and driven by a band wheel 6. This shaft 4 carries a suitable drum 3 having a comparatively smooth circumference. This drum is inclosed on the sides by casing ends 7, on its front by a curved sheet metal hood 8 and on its rear by a similar hood or casing 10. Arranged above the drum 3 and somewhat in advance of a vertical plane through its axis, is a feeding cylinder 20 having a shaft 30 which extends through the side plates 16 of the hopper 19 and journaled in bearings 29. These bearings 29 are held between adjustable bearing portions 25 and 26 which are secured together by bolts 27 and coil springs 28 (Fig. 3). These spring bolts will allow the part 25 to spring backward should any solid material force the apron 22 out of its normal position, as hereinafter explained. The cylinder 20 is provided with projections 21 which are preferably flat and staggered over the surface, as shown in Fig. 1, said projections acting to feed the seed over a curved guide apron 22 which is arranged about the lower part of the cylinder 20, as clearly shown in Fig. 2. This curved apron 22 is secured to arms of the bearing portions 25 by means of studs 23, which extend through curved slots 24 whereby the connection of the bearing frame 25 on the outside of the hopper may be connected with the apron on the inside of the hopper. The forward end of this apron 22 preferably terminates at or about the lowest point of the cylinder 20 and its upper or rear edge is preferably curved backward so as to readily receive the falling seed, and guide it downward and forward and discharge it upon the separating cylinder 3 at a point immediately below the feeding cylinder 20. The position of the feeding apron 22 may be adjusted by means of screw threaded rods 31 connected at one end to the bearing frames 25 and having their other ends extended through the forward flanges of the end plates 16 and held in adjusted position by nuts 32, which construction is best shown in Fig. 3. By means of these adjusting devices, the bearing frames 25 may be adjusted about the shaft of the drum 20 and may shift the feeding end of the apron 22 so as to cause the seed to be dropped upon the revolving cylinder 3 at a position which may be found most suitable for the character of material being treated.

The upper portion of the hopper proper is provided at the front part with wooden cross pieces to prevent the escape of the seed at the front of the cylinder and is provided at the rear part with a vertically arranged board 18 hinged at the top at 33, and normally spring pressed to a more or less close position with respect to the projections 21 of the cylinder by means of spring devices 34, said spring devices constituting coil springs held by bolts and pressing upon plates secured to the hinged board 18. In this manner, the board normally provides a back to the hopper 19 and the amount of seed which is fed down to the apron from the hopper is governed by the distance between the said board 18 and the surface of the cylinder 20 and traversed by the projections 21. The board is yielding, so that if any hard foreign substances should find their way into the hopper, they could be conveyed past the board by causing it to swing backward against the springs and permit the passage of the objectionable matter without breaking the teeth of the cylinder.

The upper part of the front apron 8 is preferably provided with an adjustable portion 42 which is bent upward as shown in Fig. 2, so as to act as a guard to prevent any object delivered to the cylinder 3 by the feeding cylinder 20 from passing outward; and moreover, this guard is adjustable by means of the clamping devices 43 so as to regulate the distance between the inner end of the guard and the feeding end of the apron 22.

At the forward part of the machine and immediately below the space 9 between the apron 8 and the cylinder 3 may be provided a suitable transverse trough 14 for receiving foreign metallic or heavy bodies which are separated from the seed, as graphically illustrated in the drawing, Fig. 2. At the rear part of the machine and below the space 11 between the apron and the cylinder is a hopper-shaped receptacle 12 for receiving the seed, and this receptacle may be provided with a suitable conveyer screw 13 for conveying the seed away to any suitable point of discharge. The apron 10 may also be provided with a vent opening provided with a transverse controlling door 15 hinged thereto for providing a relief through which chaff and dust may be discharged, the size of the opening being regulated to suit the amount of relief necessary.

The drum 20 is driven from the shaft of the revolving drum 3 indirectly through the following devices: The shaft 4 of the separating drum 3 is provided upon one end with the cone pulley 41 which is arranged to drive a cone wheel 39 by a belt 40, said wheel 39 being secured to a shaft 36 carried in bearings 37 and having at the opposite end a sprocket pinion 35$^a$, said pinion being coupled with a sprocket wheel 35 on the feeding drum shaft 30 by means of a sprocket chain 38. In this manner, the revolving drum 3 is arranged to have a high surface speed, whereas the feeding drum 20 operates at a low speed, and moreover, this speed of the drum relatively to the speed of the cylinder may be modified by adjusting the belt 40 to different portions of the cone pulley 41 and cone wheel 39, as will be readily understood. Any other suitable means of driving the feeding drum may be employed in lieu of that shown.

Considering the operation of the machine, the seed is supplied from the hopper 19 to the surface of the cylinder 3 in definite quantities in a continuous manner by the feed drum 20, and the frictional contact of the said seed with the rapidly moving surface of the drum, together with the action of the moving strata of air set in motion by the cylinder, will cause it to travel in the direction of the arrow and find its way through the chamber 11 into the receptacle 12. This action is assisted by the fact that no resistance to the movement of the seed is provided by air currents, the space intermediate of the feeding drum 20 and the cylinder 3 being open to the atmosphere. Should any hard materials or foreign matters of considerable size and weight pass in with the seed, as frequently happens, said materials will be fed down with the seed and when they fall upon the drum their greater weight will cause them to pass forward and through the chamber 9 into the trough 14; whereas, the lighter seed will pass backward over the drum and discharge into the receptacle 12, the dust and chaff or waste lighter particles being driven out of the valved opening 15, so that the seed as it is delivered into the receptacle 12 is in a condition not only separated from the objectionable foreign substances of metal and other materials, but will be more or less purified from chaff and dust, and hence in a relatively clean condition and suitable for subsequent processes. Should the foreign substances be appreciably large, such that they would be greater in thickness than the radial length of the projections 21, then the board 18 will swing outward and let them pass, and likewise when they pass between the apron 22 and the drum 20, the apron may move away from the drum against the action of the springs 28 sufficiently to let the foreign matter pass without breakage of the machinery. Ordinarily, these movements to the parts 18 and 22 would not come into play, but whenever the objectionable foreign matter was either sufficiently large or should catch upon the projections 21 of the drum, then the yielding capacity of the parts 18 and 22 would be brought into play.

I have shown my invention in the form which I have found excellently adapted for commercial purposes, but I do not restrict myself to the details here shown, as these may be modified in various ways without departing from the spirit of the invention.

Having now described my invention, what I claim as new and desire to secure by Letters Patent, is:—

1. In a seed cleaning machine, a large rotating separating drum, combined with a small feed cylinder having projections arranged above the separating drum, a hopper for supplying seeds to the upper portion of the feed cylinder, an adjustable feed apron extending under the feed cylinder and axially pivoted thereto, and means for adjusting the feeding end of the apron in the plane of rotation of the separator drum, whereby the seed may be delivered to the separating drum at various positions in advance of a vertical plane through its axis.

2. In a seed cleaning machine, a large rotating separating drum, combined with a small feed cylinder having projections arranged above the separating drum, a hopper for supplying seeds to the upper portion of the feed cylinder, an adjustable feed apron extending under the feed cylinder and axially pivoted thereto, and means for adjusting the feeding end of the apron in the plane of rotation of the separator drum, and spring supports for the feed apron to enable the apron to yield should hard substances of large size find their way between the feed cylinder and apron, whereby the seed may be delivered to the separating drum at various positions in advance of a vertical plane through its axis.

3. In a seed cleaning machine, a large rotating separating drum, combined with a small feed cylinder having projections arranged above the separating drum, a hopper for supplying seeds to the upper portion of the feed cylinder, a yielding back to the hopper to normally prevent seed passing freely between the cylinder projections and hopper back but which yields for the passage of large foreign hard substances, an adjustable feed apron extending under the feed cylinder and axially pivoted thereto, and means for adjusting the feeding end of the apron in the plane of rotation of the separator drum, whereby the seed may be delivered to the separating drum at various positions in advance of a vertical plane through its axis.

4. In a seed cleaning machine, the combination of a separating drum, a feeding cylinder above and in advance of the vertical center of the separating drum, a hopper above the feeding cylinder and having a spring supported yielding back, a feed apron extending under the feeding cylinder and yieldingly movable away from the cylinder to permit the passage of objectionable foreign objects, a casing for the separating drum open adjacent to the feeding cylinder and extending down in front of and back of the separating drum, whereby the seed passes to the back of the separating drum and the foreign heavy articles pass to the front of the separating drum.

5. In a seed cleaning machine, the combination of a large separating drum, feeding means above the drum and above its rising surface to supply seed to the drum, a casing extending over the drum and comprising side plates connected by hoods over the front and back portions of the drum and terminating upon each side of the feeding means therefor, and a chaff and dust vent provided with a valve arranged in the rear hood to allow the escape of dust and chaff while the seed are passing downward between the drum and rear hood.

6. In a seed cleaning machine, the combination of a large separating drum, feeding means above the drum and above its rising surface to supply seed to the drum consisting of a rotating cylinder and a feed apron adjustable circumferentially under it to adjust the point of supply of seed to the separating drum, a casing extending over the separating drum and comprising side plates connected by hoods over the front and back portions of the separating drum and terminating upon each side of the feeding means therefor, and an adjustable plate for the front hood at its upper part to control the width of open space between said hood and feed apron.

7. In a seed cleaning machine, the combination of a revolving drum, a feeding cylinder arranged above the drum and to one side of the vertical plane through its axis, a shaft for the cylinder, a hopper arranged above the feeding cylinder and having end plates having bearings in which the cylinder shaft is journaled said end plates also provided with slots, a feed apron arranged about the lower part of the feeding cylinder and terminating approximately at the lowermost portion of the circumference thereof, arms arranged upon the outside of the end plates of the hopper and journaled concentric with the axis of the feeding cylinder, connections between the arms and the feed apron extending through the slots in the end plates, and means for holding the arms in different positions of adjustment for adjusting the apron circumferentially with respect to the feeding cylinder.

8. In a seed cleaning machine, the combination of a revolving drum, a feeding cylinder arranged above the drum and to one side of the vertical plane through its axis, a shaft for the cylinder, a hopper arranged above the feeding cylinder and having end plates having bearings in which the cylinder shaft is journaled said end plates also provided with slots, a feed apron arranged about the lower part of the feeding cylinder and terminating approximately at the lowermost portion of the circumference thereof, arms arranged upon the outside of the end plates of the hopper and journaled concentric with the axis of the feeding cylinder, connections between the arms and the feed apron extending through the slots in the end plates, spring devices for holding the arms to the bearings of the cylinder shaft whereby said arms and apron may move radially with respect to said shaft, and means for holding the arms in different positions of adjustment for adjusting the apron circumferentially with respect to the feeding cylinder.

In testimony of which invention, I hereunto set my hand.

ALFRED D. KENNEDY.

Witnesses:
C. J. BINION,
W. McC. NEALE.

Copies of this patent may be obtained for five cents each, by addressing the "Commissioner of Patents, Washington, D. C."